US009106099B2

(12) United States Patent
Gelonese (10) Patent No.: US 9,106,099 B2
(45) Date of Patent: Aug. 11, 2015

(54) POWER MONITORING SYSTEM (75) Inventor: Guiseppe Antonio Gelonese, Para Hills (AU)

(73) Assignee: EMBERTEC PTY LTD., Dulwich, South Australia (AU)

( * ) Notice: Subject to any disclaimer, the term of this patent is extended or adjusted under 35 U.S.C. 154(b) by 735 days.

(21) Appl. No.: 13/376,235

(22) PCT Filed: Jun. 3, 2010

(86) PCT No.: PCT/AU2010/000691
§ 371 (c)(1),
(2), (4) Date: Dec. 5, 2011

(87) PCT Pub. No.: WO2010/139020
PCT Pub. Date: Dec. 9, 2010

(65) Prior Publication Data
US 2012/0080949 A1 Apr. 5, 2012

(30) Foreign Application Priority Data
Jun. 3, 2009 (AU) .................................. 200902532

(51) Int. Cl.
*H02J 3/14* (2006.01)
*H02J 3/28* (2006.01)
*H02J 13/00* (2006.01)

(52) U.S. Cl.
CPC ... *H02J 3/14* (2013.01); *H02J 3/28* (2013.01); *H02J 13/0075* (2013.01); *Y02B 70/3225* (2013.01); *Y02B 70/3266* (2013.01); *Y02B 90/222* (2013.01); *Y02B 90/2653* (2013.01); *Y02E 40/76* (2013.01); *Y04S 10/545* (2013.01); *Y04S 20/12* (2013.01); *Y04S 20/222* (2013.01); *Y04S 20/242* (2013.01); *Y04S 40/126* (2013.01); *Y10T 307/406* (2015.04)

(58) Field of Classification Search
USPC ........................................................... 307/31
See application file for complete search history.

(56) References Cited

U.S. PATENT DOCUMENTS

| 4,901,007 | A | 2/1990 | Sworm |
| 6,476,729 | B1 | 11/2002 | Liu |
| 6,828,695 | B1 | 12/2004 | Hansen |
| 7,944,086 | B2 * | 5/2011 | Hodges et al. .................. 307/31 |
| 8,219,154 | B2 * | 7/2012 | Wakamatsu .................. 455/572 |
| 8,669,716 | B2 * | 3/2014 | Recker et al. ................. 315/291 |

(Continued)

FOREIGN PATENT DOCUMENTS

WO WO 2005/111766 11/2005
WO WO 2010/139020 12/2010

OTHER PUBLICATIONS

International Search Report for PCT/AU2010/000691, International Filing Date: Jun. 3, 2010.
Written Opinion for International Application No. PCT/AU2010/000691, filing date Jun. 3, 2010.

(Continued)

*Primary Examiner* — Rexford Barnie
*Assistant Examiner* — Daniel Kessie
(74) *Attorney, Agent, or Firm* — Novak Druce Connolly Bove + Quigg LLP (57) ABSTRACT

A power monitoring system to monitor electrical power supply to electrical equipments. The monitor includes an energy saving device to reduce unnecessary power consumption. A control means for enabling control of power consumption of electrical devices in response to the data output of the monitored power consumption.

16 Claims, 7 Drawing Sheets

(56) References Cited

U.S. PATENT DOCUMENTS

2005/0289378 A1 12/2005 Vorenkamp et al.
2010/0079001 A1* 4/2010 Lee et al. .......................... 307/40
2010/0295371 A1* 11/2010 Lee et al. .......................... 307/41

OTHER PUBLICATIONS

International Preliminary Report on Patentability for International Application No. PCT/AU2010/000691, filing date Jun. 3, 2010.

* cited by examiner

POWER MONITORING SYSTEM

CROSS-REFERENCE TO RELATED APPLICATIONS

This application is a §371 national stage entry of International Application No. PCT/AU2010/000691, filed Jun. 3, 2010, which claims priority to Australia Application No. 2009902532, filed Jun. 3, 2009, both of which are hereby incorporated herein by reference in their entirety.

TECHNICAL FIELD

This invention relates to aspects of the monitoring of electrical power supply to electrical equipment. In particular, the invention is concerned with monitoring of electrical power supply with a view to reducing unnecessary power consumption and resulting in energy saving.

BACKGROUND OF THE INVENTION

The following references to and descriptions of prior proposals or products are not intended to be and are not to be construed as statements or admissions of common general knowledge in the art. In particular, the following prior art discussion does not relate to what is commonly or well known by the person skilled in the art, but may assist in the understanding of the inventive step of the present invention, of which the identification of pertinent prior proposals is but one part.

In many parts of the world, there is a high level of concern over excess energy usage. There have been many proposals aimed at saving energy, at both international and national levels.

In the area of inventions which may effect energy savings, reference is made to International Patent Application No WO 2005/111766 and International Patent Application No WO 2008/064410. Each of these patent specifications is incorporated herein by reference and both are referred to below as the International Applications.

The International Applications disclose inventions where electrical devices are connected to a single mains supply electrical outlet, and the current flow through and voltage across at least one of the electrical devices is monitored in order to determine a functional state of that device. Depending on the nature of the functional state of the device and the nature of the other electrical devices, the supply of power to any or all of the other electrical devices can be shut off, so that not all electrical devices are powered in situations where power to them is unnecessary.

The present invention is predicated upon the concept that energy saving capability of such energy saving devices as those in the International Applications may be enhanced by monitoring and, in some embodiments, by networking a plurality of such energy saving devices.

Although energy saving devices such as those in the International Applications may autonomously maximise energy savings at their individual level, it is believed that the addition of networking capability can provide advantages not available before now.

DISCLOSURE OF THE INVENTION

Accordingly, in a first aspect this invention provides a system for monitoring power consumption of a plurality of electrical devices, the system including:
  means for communicating with an energy saving device of the type permitting energisation of a plurality of electri cal devices from a single mains supply electrical outlet, the energy saving device having:
    a plurality of controlled electrical outlets and a single electrical input adapted to connect to a mains supply electrical output; and
    switch means adapted to connect electrical supply from the mains supply electrical outlet to each of the controlled electrical outlets in response to a sensed state of at least one of the electrical devices;
  monitoring means for monitoring power consumption of the controlled electrical outlets; and
  output means for outputting data relating to the monitored power consumption.

Preferably, the system of the invention includes control means for enabling control of power consumption of the electrical devices in response to the data output of monitored power consumption. More preferably, the control means enables adjustment of settings of the energy saving device in response to the data output of monitored power consumption.

In a second aspect, the invention provides a method for monitoring power consumption of a plurality of electrical devices, the method including the steps of
  communicating with an energy saving device of the type permitting energisation of a plurality of electrical devices from a single mains supply electrical outlet, the energy saving device having:
    a plurality of controlled electrical outlets and a single electrical input adapted to connect to a mains supply electrical output; and
    switch means adapted to connect electrical supply from the mains supply electrical outlet to each of the controlled electrical outlets in response to a sensed state of at least one of the electrical devices;
  monitoring power consumption of the controlled electrical outlets; and
  outputting data relating to the monitored power consumption.

Preferably, the method of the invention includes a further step:
  controlling power consumption of the electrical devices in response to the data output of monitored power consumption. More preferably, the controlling step is effected by adjusting settings of the energy saving device in response to the data output of monitored power consumption.

The system and method of the invention may be used at various levels—for example, to monitor and optionally control power consumption of a group of electrical devices, such as a group of audio/visual entertainment devices.

At a higher level, monitoring (and, optionally, control) may take place of many electrical devices within a home or office, for example.

At an even higher level, monitoring (and, optionally, control) may take place in a centralized facility, such as an electrical utility or agency, with the aim of remote monitoring and optionally controlling energy saving function for individual outlets. Examples of this are setting idle power threshold limits, "active standby" timeout periods, time-of-day usage based on tariffs, and so on.

Monitoring can have many advantages, especially in detecting abnormal usage, faults and theft.

As an example of abnormal usage, the system and method of the invention may detect excessive power consumption from a monitored general power outlet (GPO) in an office environment, which may be due to use of a portable heater. As a result, supervisory personnel can be alerted to the abnormal energy usage.

Monitoring may alert a user to cessation of power consumption, for example caused by breakdown of a refrigerator or freezer, or unexpected power use by a normally unused appliance. The system or method of the invention may alert the user to this type of fault detection, for example, by email, SMS, etc.

Monitoring may also alert a user to theft of an electrical device, or to unauthorized removal of the device from its electrical socket.

Preferably, more than one of the energy saving devices is used in the system or method of the invention. The energy saving devices may be of one type or of two or more different types. Preferably, when there are two or more energy saving devices to be used in the system or method of the invention, they are networked.

In this embodiment, networking may be effected in various ways. For example, one energy saving device may act as a master device, with the other energy saving device or devices acting as slaves, networked communication taking place between the master and each slave, with any influence of the slaves on each other being managed by the master.

As another example, there may be direct communication from one like slave to another—either as a 1-to-1 dialogue, or by each slave monitoring the status of the others by monitoring the master-slave communications messages. This could be as used in various situations: for example, to make a collective decision to shed load on an overloaded circuit, or in cases where the total power or energy consumption of devices on the network exceeds a limit set by the user; to turn off a TV in one room when a TV or stereo in another room is being used; to turn off lights, heaters etc. in one room when those in another room are being used.

As a further example, there may be energy saving devices of different types in a network, such as an energy centre and wall plugs/GPOs co-existing on a single network. Especially with a user interface, the energy centre may act as a communications control centre for the wall plugs/GPOs, as well as being an energy saving device in its own right.

In one preferred embodiment, the energy saving device is any of those disclosed in either of the incorporated International Applications.

Thus, the energy saving device may include a state sensor adapted to detect a functional state of a master electrical device, the sensor being adapted to distinguish at least two functional states of the master device by sensing the value of current flow through and voltage across the master device for calculation of the power consumption of the master device.

In another embodiment, the energy saving device may include both a state or power sensor, adapted to detect power use by measuring current flow through and voltage across a master electrical device and producing a power use signal, and a computer processor adapted to process the power use signal to determine at least two functional states of the master electrical device, the switch means being controlled by the computer processor and adapted to connect an electrical supply from the supply electrical outlet to each of the controlled electrical outlets, which of the controlled electrical outputs is controlled to be connected to the electrical supply being determined by the determined functional state.

The state or power sensor may measure True RMS power. The term "True RMS power" as used herein refers to an average measurement of power over a predefined period of time, regardless of waveform. The state or power sensor may be embodied in the form of an analogue electronic circuit which multiplies instantaneous voltage and current signals to derive a True RMS Power signal or by using a micro-controller to digitise the voltage and current signals and then multiplying, adding and averaging the sampled values to calculate the True RMS power value.

The state or power sensor may measure Reactive Power (the result of inductive or capacitive loads where current is flowing but nor performing any "real" work).

The term "master device" as used herein may be a single electrical device or a number of electrical devices each requiring power supply. The term "master device" is intended to cover a combination of devices such as a computer, audio equipment, visual equipment, etc, each of which is attached to the power supply device.

Although the energy saving device is preferably one of those disclosed in the incorporated International Applications, it may be chosen from any suitable such device. For example, the energy saving device may switch electrical supply in response to sensed current variations.

The sensed states of the electrical device may be "on", a reduced power state hereafter called "standby", and/or "off".

The energy saving device may take any desired form but preferably is a power board, a general power outlet (GPO), a wall plug or an energy centre. It is preferred that the system or method of the invention are used in connection with "plug-in" electrical devices, but the system or method may also be used with electrical devices which are permanently wired to mains electrical power. In the latter case, the energy saving device could be incorporated into the mains wiring infrastructure or incorporated as an integral part of mains powered equipment.

The means for communicating with the energy saving device is preferably a microcomputer communicating via a wired link or a wireless link, such as low interference potential device (LIPD), Zigbee, or Bluetooth, RS-485 or CAN bus.

The data output means may take any desired form, such as a signal converted to an audible signal for a beeper, or a light or output to LCDs or LEDs.

When present, the control means for enabling control of power consumption may take the form of user interface facilities to allow users to customise settings in order to optimise energy savings for their particular installation, configuration and/or usage requirements.

The control means may include, for example, a centralised facility operating via networked connections, such as a device front panel or a hand held device, in each case allowing a user to control and optimise energy saving.

In many applications, centralized real-time monitoring and, optionally, control can be provided for effective optimization of energy saving capability. The energy saving devices may be regarded as networked to allow centralized or distributed user interface facilities to be used to control and monitor the energy saving devices, allowing energy saving capability to be optimized cost-effectively in home or office environments.

Networking of energy saving devices may be effected using wired or wireless networking technology or powerline carrier based communications. Non-limiting examples of wired technology include RS-232, RS-485 and CAN bus. Non-limiting examples of wireless technology include low interference potential device (LIPD), Zigbee, Z-wave, Insteon, Bluetooth and WiFi. Non-limiting examples of powerline carrier based networking technologies include X-10, Insteon and Lonworks.

In a third aspect, the invention provides a user interface for use with a monitoring device for monitoring power consump tion of a plurality of electrical devices, the user interface including:
   means for receiving data output from the monitoring device relating to the monitored power output;
   signalling means for sending a signal in response to the received data; and
   control means for communicating with the monitoring device to effect a change in power consumption of at least one of the electrical devices.

BRIEF DESCRIPTION OF THE DRAWINGS

The invention will now be described with reference to certain non-limiting embodiments in connection with the accompanying drawings in which.

DETAILED DESCRIPTION OF THE DRAWINGS

Figure 1:
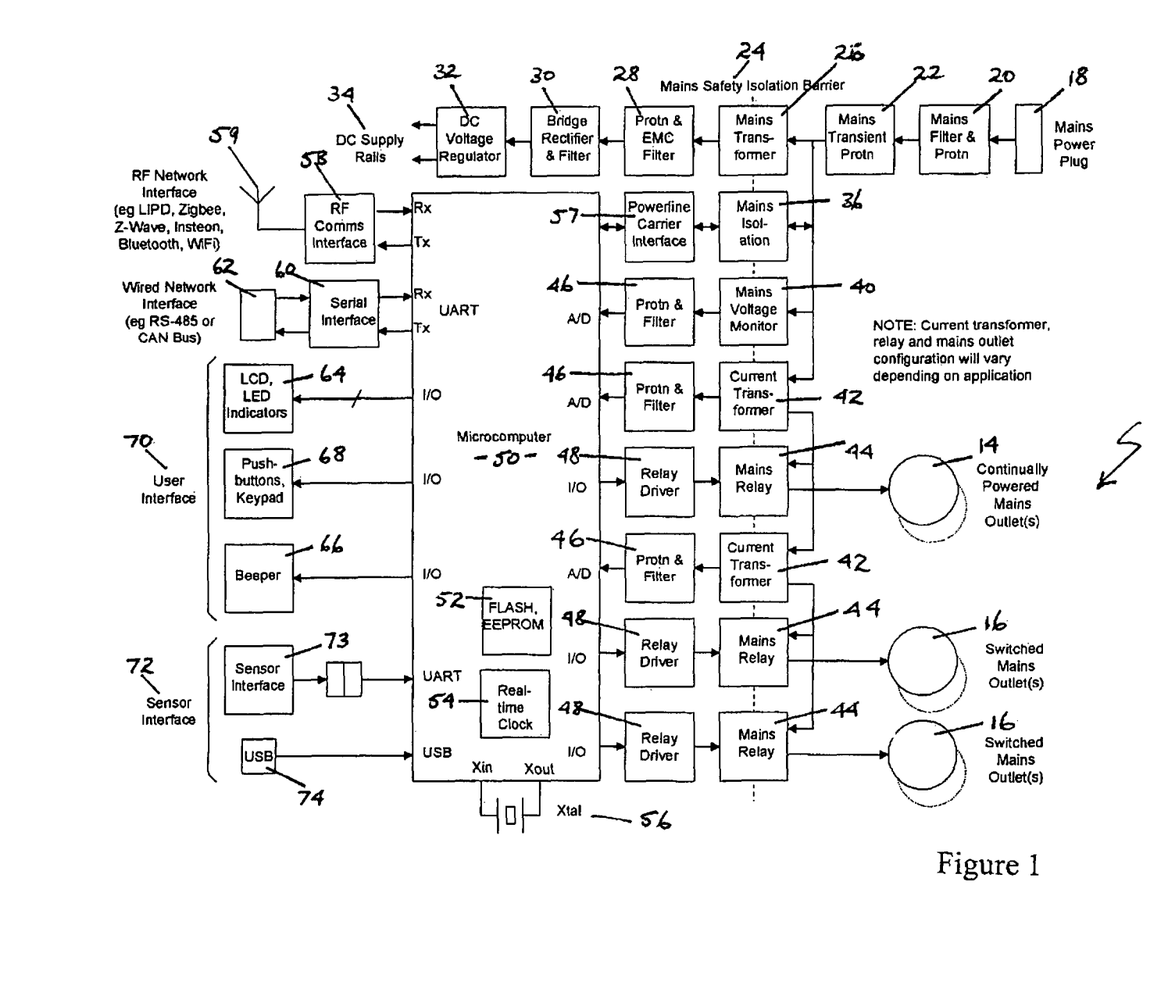
FIG. 1 is a block diagram showing as a general representation various embodiments of networking of an energy saving device, for the purposes of illustration.

Referring first to FIG. 1, it is to be understood that this is a general representation of a networked energy saving device and is illustrative only. It is not intended to limit the number or configuration of continually powered or switched main outlets, or of communication interfaces of other functional modules.

FIG. 1 shows an energy saving device indicated generally at 12 having one or more continually powered mains outlets 14 and two or more switched mains outlets 16. Electrical devices (not shown) are intended to be plugged into mains outlets 14 and switched mains outlets 16 as required.

Energy saving device 12 has a mains power plug 18 for connection to a mains power supply (not shown).

Electrical supply to electrical devices (not shown) connected to switched mains outlet 16 is controlled by switch means 48 in response to, for example, a power state (such as on, standby or off) of an electrical device connected to continually powered mains outlet 14 or to switched mains outlet 16.

As can be seen from FIG. 1, mains power input through mains power plug 18 passes through a mains filter and protection device 20, which may incorporate EMC filtering and a circuit breaker, to protect against over-current should there be a failure of connected mains-powered devices, or connection of inappropriately-rated devices, for example.

Mains power is also subject to mains transient protection device 22, which may incorporate metal oxide varistors of appropriate rating, in order to protect device electronics and connected mains-powered devices from over-voltage transients from mains power.

Energy saving device 12 also includes mains safety isolation barrier 24, including a number of elements, as discussed below.

Mains transformer 26 operates to generate low voltage isolated supply for powering device electronics. Mains transformer 26 is protected by low voltage supply protection and EMC filter 28, which can prevent the risk of overheating and fire in the event of catastrophic failure of unit electronics and which can filter out electric noise signals to enhance EMC emissions and immunity capability.

Bridge rectifier and filter 30 generates smoothed low voltage DC power supply from the low voltage AC supply through mains transformer 26. DC voltage regulator 32 generates DC supply rails 34 for powering unit electronics, from the smoothed low voltage DC power supply.

Mains isolation at 36 is interposed between the mains power and powerline carrier interface 38 to prevent unit electronics from being exposed to mains voltage. Powerline carrier interface 38 processes bi-directional powerline carrier communications with other devices, via the mains power connection.

Mains voltage monitor 40 provides high precision measurement of mains voltage and zero voltage detection, via a safety isolation network, to allow power consumption of connected devices to be calculated and to allow mains over-voltage and under-voltage protection switching to be implemented.

Current transformers 42 allow independent measurement of total and switched outlet currents, to permit the power consumption of connected electrical devices to be calculated, and to allow mains over-current protection switching to be implemented.

Mains relays 44 provide independent near zero-voltage switching of groups of main outlets, for over-current, over- and under-voltage protection and power saving control.

Mains voltage and current measurement signals are filtered and protected by modules 46. Relay drivers 48 switch mains relays 44 and include inductive transient snubbers to protect from inductive transients generated by the relay coil on de-energisation.

Micro computer 50 in this embodiment is an integrated system-on-chip micro computer providing processing and A/D conversion functions for implementation of energy saving algorithms and for communication, user interface and associated processing functions. Micro computer 50 includes flash and/or EEPROM non-volatile memory 52 for storage of user-savable energy saving configuration parameters and for the maintenance of a time-stamped event log, which can be uploaded and used in the energy saving optimisation process. Micro computer 50 also includes real-time clock 54 which has battery backup (not shown) for timekeeping, to allow time-stamping of event log messages. This is co-ordinated with crystal frequency reference (Xtal) 56 to provide an accurate timing source for micro computer 50 and operation of real-time clock 54.

FIG. 1 shows several types of interfaces, some or all of which may be used, as desired.

Radio frequency communications interface 58 enables the processing of bi-directional wireless RF communications between energy saving device 12 and other devices, through a wireless network connection 59. As shown in FIG. 1, standard communication methods and protocols such as low interference potential device running a proprietary protocol, Zigbee, Z-wave, Insteon, Bluetooth and WiFi may be used for this purpose.

Serial communications interface 60 enables the processing of bi-directional wire-linked communication between energy saving device 12 and other devices, via a wired network connection 62. Standard communications methods and protocol such as RS-485 or CAN bus based networks may be used for this purpose.

User interface 70 in this embodiment includes LCD or LED indicators 64, beeper 66 and pushbuttons and keypad 68. LCD (liquid crystal display) and/or LED indicators output data from monitored power consumption and provide an indication of status to the use. Status can include power application, power switching and fault status. Indicators 64 can also host user interface menus for reporting and control to allow optimisation of energy saving capability.

Beeper 66 is present to provide an audible output to indicate faults or status change conditions, such as imminent powering down of connected mains powered equipment.

Keypad 68, which may include push buttons, may have an LCD touch screen overlay option for user control to allow optimisation of energy saving capability, as discussed elsewhere.

Sensor interface 72 and 73 in this embodiment provides an interface for wired connection of an external sensor module (not shown) including a remote control IR sensor for IR remote control activity sensing in audio-visual applications. A push button pad or keypad for user control or a passive IR (PIR) detector, proximity sensor or pressure mat for user presence sensing. The purpose of this is to enable automatic power reduction or power increase to electrical devices, such as in audio-visual equipment, if power can be reduced depending on user activity and/or user absence.

USB connector 74 can connect to a USB port of a personal computer, to sense activity in PC applications, so that appropriate electrical devices can be powered down in response to reduced PC activity.

In relation to the description below, the same labels will be used for the same parts as in FIG. 1. For variations, the same numeric labels will be used, followed by the letter "a", "b", etc.

Figure 2:
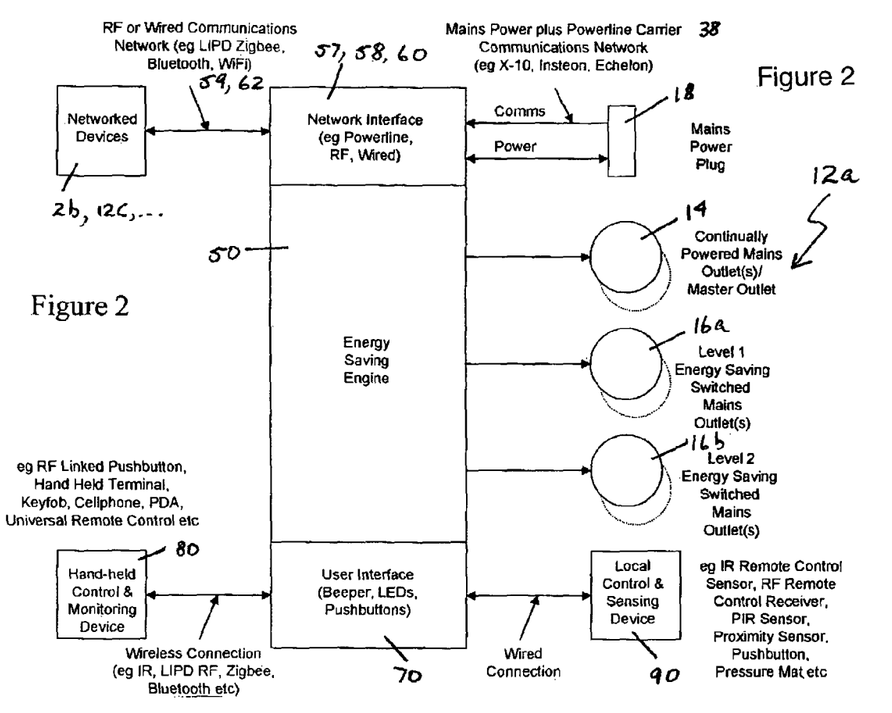
FIG. 2 shows in block diagram form an embodiment of the system of the invention showing a networked powerboard.

With reference now to FIG. 2, this shows an embodiment of the monitoring system of the invention. In FIG. 2, monitoring system 10 monitors power consumption of electrical devices, such as audio visual devices, and/or a computer and peripherals, through an energy saving device being, in this embodiment, a power board 12a. In this embodiment, power board 12a is networked with other energy saving devices 12b, 12c, etc, through a powerline carrier 38, a wireless network 59 or a wired communications network 62. Power board 12a includes one or more continually powered mains outlets 14 and switched mains outlets 16a and 16b. It is to be understood that there may be more than two switched mains outlets 16 in this embodiment.

Continually powered mains outlets 14 are switched off only during over-current, over-voltage or under-voltage events. If power board 12a is to be used for PC applications, a master device being, in this case, a personal computer, would be connected to the continually powered mains outlet 14 or to one of them if more than one. Switched mains outlet 16a will be connected to electrical devices which are to be switched off during "level one" energy saving conditions, for example when the master device is in an idle state. Examples are lamps. Switched mains outlet 16b is a "level two" outlet. Electrical devices attached to this will be switched off during level two energy saving conditions, for example when the master device is in a power-down state. Such electrical devices may include, for example, printers and modems.

Power board 12a is connected to a mains power outlet via mains power plug 18, so that this connection provides mains power to the power board 12a and connected devices, as well as to the mains power line carrier system 38.

Network interface 38 (mains powerline carrier communications network), 59 (wireless) or 62 (wired) provides facilities for communication via the mains power line carrier communications network. Typically, only one communications network, 38, 59 or 62, would be used, although a second type could be incorporated as backup, or as a plug-in option.

Monitoring of power consumption of each of outlets 14, 16a and 16b takes place in energy saving engine/microcomputer 50.

Data relating to the monitored power consumption is output in various options. One of these is user interface 70, which can provide status indication to the user through a beeper or LEDs. Optionally, user interface 70 can include user input to control power consumption, by way of push buttons or a keypad.

As an alternative, a hand-held control and monitoring device 80 may be connected to power board 12a using a wireless radio frequency connection, typically the same connection as used to support wireless radio frequency network interconnectivity. Data relating to monitored power consumption can be output to hand-held device (user interface) 80 through a beeper and LEDs. User control can be input into hand-held device 80 using a keypad. Hand-held device 80 may take the form of a hand-held terminal, a keyfob, a cell phone, a personal digital assistant (PDA) or a universal remote control, for example.

As a further alternative, local control and sensing device 90 may be provided, connected to power board 12a by a wired connection. Like the hand-held device 80, local device 90 can include user interface facilities such as LEDs and/or LCD and a beeper for output of data relating to the monitored power consumption. Control facilities such as push buttons may also be included.

Local device 90 may also include sensing facilities. In many applications, presence or absence of a user is a criterion employed by the energy saving engine 50 to determine whether electrical devices connected to power board 12a should be switched on or off. In addition to the use of user activity as determined by power consumption fluctuations or infra-red remote control signal activity, additional sensing means can be employed to determine the presence of a user in the vicinity of the energy saving device, power board 12a. Such sensing means may include passive infra-red sensors, inductive or capacitive proximity sensors, pressure mats or switches, acoustic or ultrasonic sensors, sonar, radio frequency ID tags or any other arrangement which can be employed to sense user presence. Such sensors may be included in local device 90.

Figure 3:
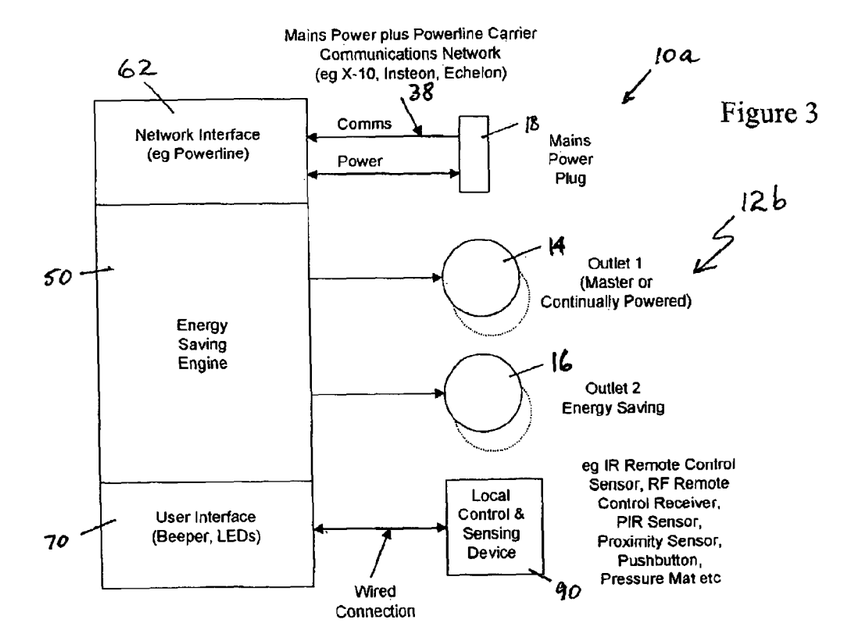
FIG. 3 shows an embodiment of the system of the invention being a universal wall plug or GPO.

Referring now to FIG. 3, this shows an embodiment of the system of the invention, being a networked universal wall plug or GPO, as the energy saving device. Monitoring system 10a includes a universal wall plug 12b, which is a low cost unit, providing facilities for the connection of multiple mains-powered devices via external multiple-outlet adaptors, in audio-visual, PC, appliance and other applications. (The same capability can be provided by a built in General Purpose Outlet format.) Wall plug 12b includes a continually-powered outlet 14 and an energy saving outlet 16, it being understood that there may be multiples of outlet 14 and/or outlet 16. As with the other embodiments, universal wall plug 10a is connected to mains power through mains power plug 18, this connection providing mains power to wall plug 12b and devices connected to outlets 14 and 16, as well as connection to the mains power line carrier system 38.

As was the case with the FIG. 2 embodiment, user interface 70 may include monitoring facilities, such as a beeper and LEDs to indicate status to a user.

Local control and sensing device 90 is connected to wall plug 12b through a wired connection and provides facilities for monitoring such as LEDs, LCDs and beepers, and for control, using push buttons for example. As was the case with local device 90 in the FIG. 2 embodiment, local device 90 in the FIG. 3 embodiment can also include sensing devices for sensing user presence.

In the FIG. 3 embodiment, appliances such as refrigerators or other white goods may be connected to wall plug 12b. The sensing facility of local device 90 may take the form of a touch sensor, a proximity sensor, a capacitive sensor, or the like connected to the case or body of the appliance. The user's touching of or proximity to the appliance could be detected by the sensing device and signal to energy saving engine 50 that the user wishes to use the appliance, leading to power being supplied to the appliance.

Although not shown in FIG. 3, another form of sensing device may be provided, involving the use of a short range battery powered wireless RF transmitter associated with the wall plug 12b. In this embodiment when the user operates the wireless transmitter via its push button or touch sensor, a wireless RF signal would be transmitted and received by wall plug 12b, causing it to supply mains power to the appliance. As will be appreciated by one skilled in the art, other means of signalling a user's power out requests may be implemented, including wired push buttons or touch sensors, infra-red linked control, inductively coupled controls, audible control and ultrasonic control.

Figure 4:
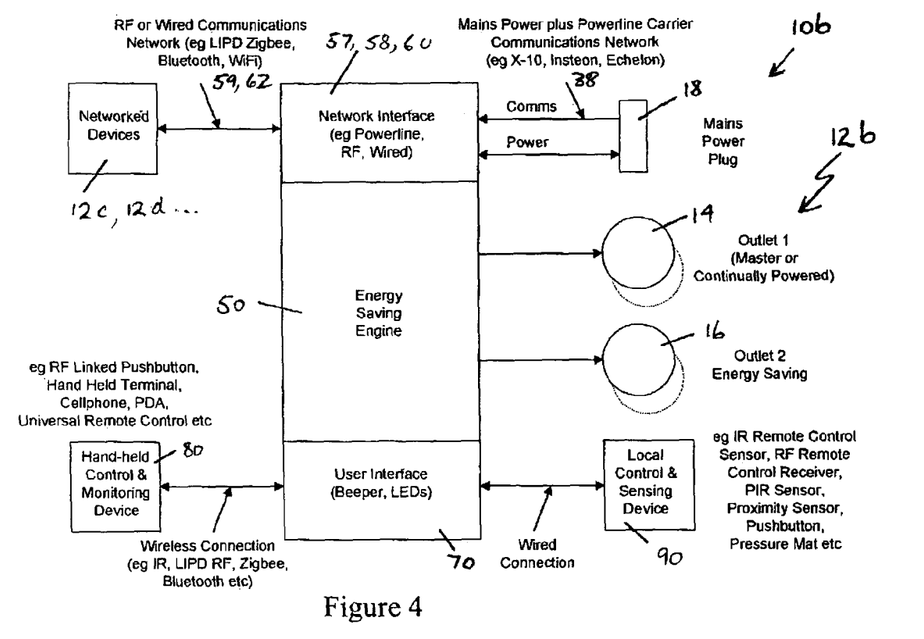
FIG. 4 illustrates an embodiment of a networked universal wall plug or GPO, similar to that in FIG. 3, but in an enhanced form.

The FIG. 4 embodiment is similar to that in FIG. 3, but presents an enhanced version. In FIG. 4, universal wall plug or GPO 12b is networked to further similar or dissimilar energy saving appliances, 12c, 12d, etc. In this embodiment, monitoring system 10b has network interconnection and user interface facilities similar to those provided by power board 12a in FIG. 2.

Figure 5:
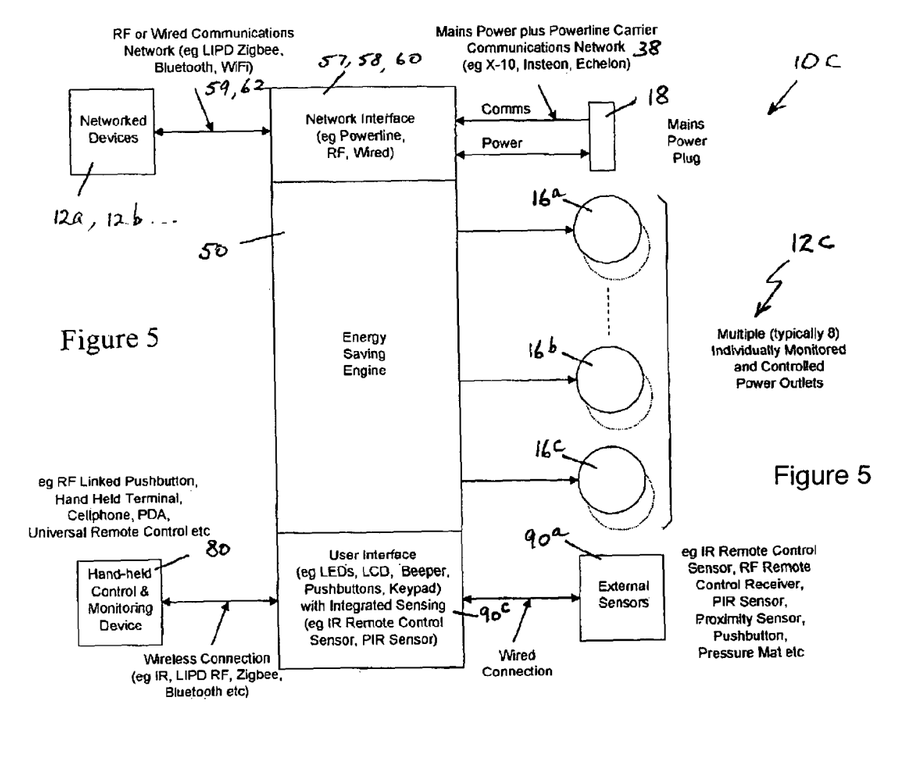
FIG. 5 is a block diagram illustration of a networked energy centre.

FIG. 5 illustrates a networked energy centre 10c. This is intended to be used in the form of an aesthetically styled unit visible to the user, typically in an audio visual system installation or in a variant form tailored for PC applications.

The facilities provided by networked energy centre 10c are similar to those provided by the system in FIG. 2, except that each of power outlets 16a, 16b, 16c (etc) is individually switchable and individually monitored for power consumption of one or more connected electrical devices. This allows the energy saving engine 50 to implement energy saving strategy for each connected electrical device separately, rather than switching multiple connected devices in unison. Thus, energy consumption of each individual device may be optimised, maximising overall energy savings while maximising user convenience.

In the FIG. 5 embodiment, local control and sensing device 90 is replaced by external sensors 90a and internal sensors 90c. Sensing power consumption independently for each connected electrical device may be used in conjunction with sensing of infra-red remote control signals in an audio visual system, to provide a self-learning capability. By decoding infra-red remote control signals and associating particular signal codes with changes in power consumption from the various mains outlets, the energy saving engine 50 can learn to associate the infra-red power on/off code for each connected electrical device, with the relevant outlet 16a, 16b, 16c . . . to which that device is connected. From knowledge of the power state of each connected electrical device, the energy saving engine 50 can determine when the user has sent a power down command to the electrical device from the infra-red remote control and can switch off mains power to that electrical device. Correspondingly, the energy saving engine 50 can determine when the user wishes to reactivate the electrical device, and can switch on power accordingly.

The learning by the energy saving engine 50 of infra-red remote control codes for on/off control of the electrical devices connected to each individual power outlet 16a, 16b, 16c . . . can facilitate the use of programmable infra-red remote controls, which can allow multiple items of electrical devices to be controlled via a reduced number of keystrokes, compared to the number of keystrokes which would be required to control each electrical device individually. Groups of equipment can be powered up or down conveniently for different usage scenarios, for example, watching television, listening to music, playing an electronic game or watching a DVD.

The energy centre 12c in the FIG. 5 embodiment may be equipped with appropriate remote control receivers to enable wireless radio frequency remote controls, such a Bluetooth, Zigbee, Z-Wave or similar devices.

The energy centre embodiment 12c integrates user interface facilities such as LEDs, LCDs and push buttons, as well as sensing devices such as infra-red remote control sensor and infra-red sensor into the housing. User presence may be sensed by interconnection facilities to an external sensing device, such as a proximity sensor or pressure mat.

Figure 6:
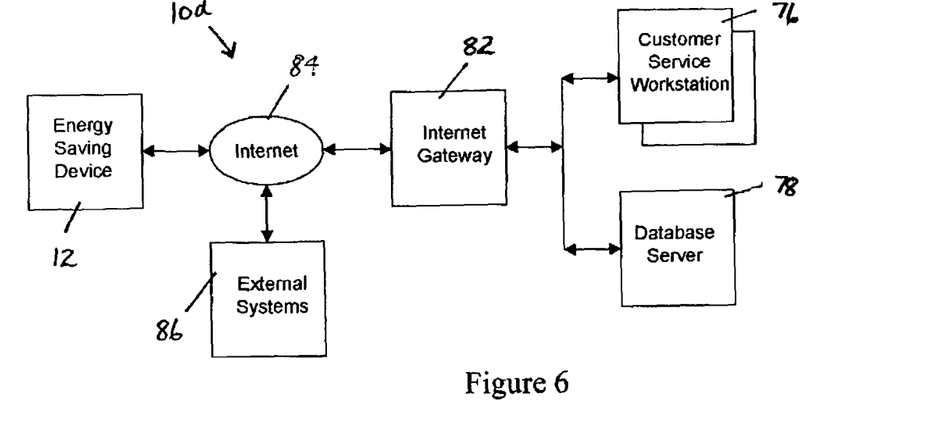
FIG. 6 is a block diagram showing an embodiment illustrating a customer service centre and database.

The FIG. 6 embodiment shows system 10d as a customer service centre. Customer service centre 10d includes one or more customer service work stations 76 and a database server 78. These are networked, using standard computer networking methods, allowing access to an internet gateway 82, allowing communication via the internet 84 with energy saving devices 12 (only one of which is shown) and external systems 86, such as a power management system of an electricity supply entity.

Database server 78 stores configuration data and historical power usage records, etc, for energy saving devices 12 with which it communicates. Customer service centre 10d may include computer facilities (not separately shown) hosting automated software to implement functions such as periodic data and status collection from energy saving devices 12, detection of fault conditions or erroneous power consumption events and the generation of alerts to users, electricity supply company service personnel or emergency services, for example.

Customer service work stations 76 may run purpose-built software which allow customer service operators to communicate with users and with their energy saving devices 12.

Customer service centre 10d may thus provide facilities which allow monitoring of energy saving devices 12 from a centralised location, such as a service centre for the electricity supply company. Optionally, customer service centre 10d may also provide facilities for control of energy saving devices 12, and/or may provide value added facilities to users, typically in return for payment or other consideration.

Figure 7:
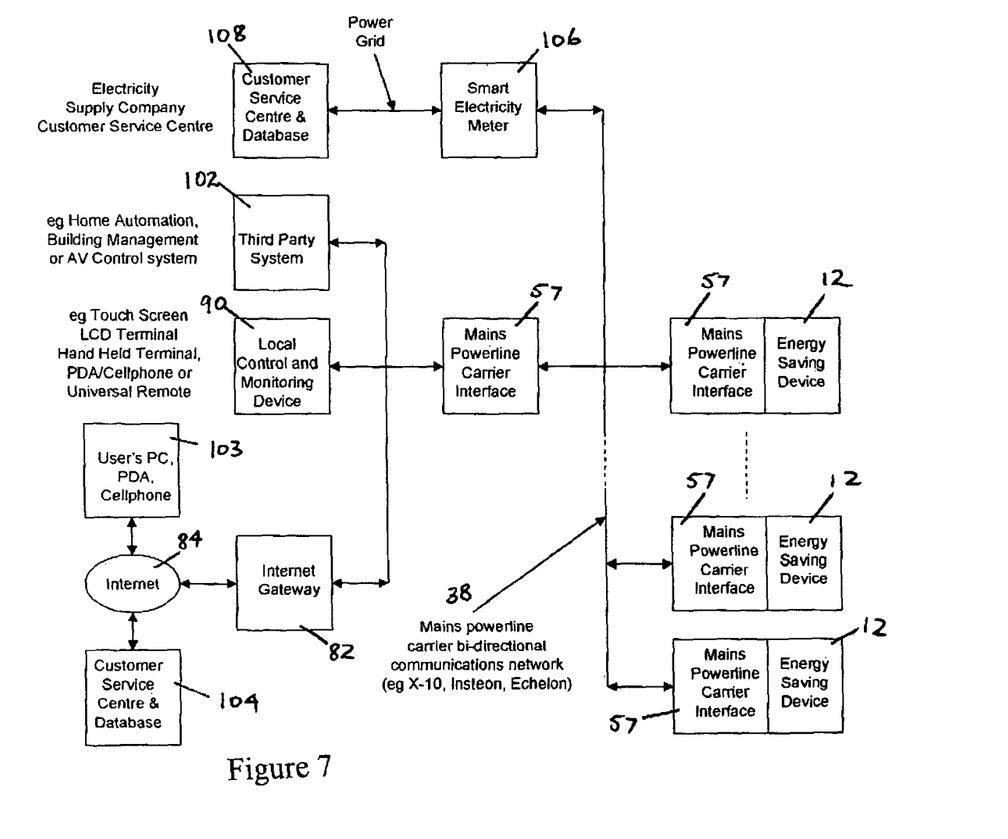
FIG. 7 is a block diagram illustrating a mains powerline carrier network for an embodiment of the system of the invention.

In FIG. 7, each of energy saving devices 12 is linked by mains powerline carrier communications 57 to local control terminals or PCs, with a smart electricity meter 106 and internet gateway 82, as well as optionally to other energy saving devices (peer-to-peer), to allow implementation of network-enabled facilities described below.

Mains power line carrier communication is standard technique applied to domestic, office, commercial, industrial and other environments. As shown in FIG. 7, applicable power line carrier networking technologies include (but are not limited to) X-10, Insteon, Echelon and so on.

As shown in FIG. 7, several energy saving devices 12, each equipped with an integral mains power line carrier interface capability 57, are interconnected via mains power line carrier bi-directional communications network 38, with bi-directional mains power line carrier links providing communication facilities between the energy saving devices 12 and other devices. Energy saving devices 12 may be the same or different, as described elsewhere.

Other devices, as referred to below, may be connected to the network. A mains power line carrier interface 57 can allow a range of ancillary devices to communicate with the energy saving devices 12 via the power line carrier network 38. This may be achieved by direct wired connection or by wireless connection to the gateway, for example, USB or RS-232, or via a secondary network such as Ethernet, Wifi or Bluetooth. Alternately, ancillary devices may incorporate their own integral mains power line carrier interface and connect directly to the main supply and power line carrier network 38.

One of the connected devices may be local control and monitoring device 90, which can provide user interface facilities. As indicated in FIG. 7, these can include an LCD display, a touch screen and keypad. Instead of a local control and monitoring device wired to the network, the monitoring device may be self-contained, such as a cell phone, a personal digital assistant (PDA) or a universal remote control, preferably including custom software to implement energy saving device monitoring and control functions.

Another device which may be included in the network is a third party system 102. This may be represented by home automation, building management, audio visual control or other systems, which can permit the third party system 102 to monitor and, optionally, control energy saving devices 12.

Another method of interfacing with energy saving devices 12 via mains power line carrier network 38 is through internet gateway 82, providing access via any of the means provided by the internet 84. In this way, users may remotely monitor and, optionally, control energy saving devices 12 from remote locations, including using devices such as a PC, PDA, cell phone or any other device 103 which provides suitable user interface facilities.

Internet gateway 82 and the internet 84 may also be used to access network 38 and energy saving devices 12 from a remote customer service centre 104. Customer service centre and database 104 may be operated, for example, by the electricity supply company or by an independent energy management service provider.

A further device which may be connected to network 38 is smart electricity meter 106. This can support local power line carrier communications within the premises in which network 38 is located and also provide a communications gateway to a wide area communications link, for example by wide area power lines communications, wireless network, cable network, etc, typically providing connection to a customer service centre and database 108 operated by the electricity supply company at its customer service centre.

Figure 8:
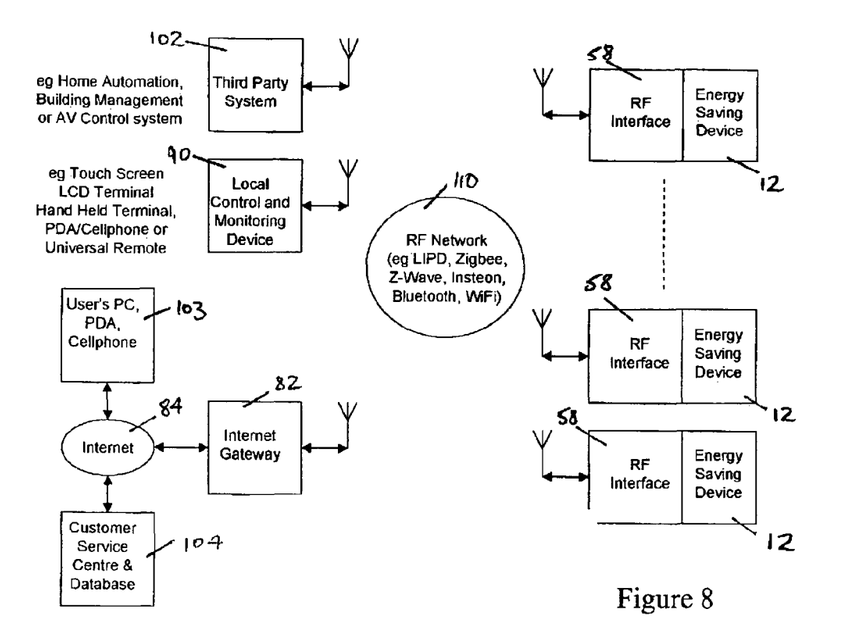
FIG. 8 is a block diagram showing an embodiment similar to that in FIG. 7, but illustrating a wireless radio frequency network.

The embodiment in FIG. 8 shows a wireless network 110, which is otherwise similar to network 38 in FIG. 7. Instead of mains power line carrier interface 57, the FIG. 8 embodiment has radio frequency interfaces 58. Wireless radio frequency networking communication is a standard technique applied to domestic, office, commercial, industrial and other environments. In this embodiment, wireless radio frequency network 110 may link energy saving devices 12 with each other, with local control and monitoring devices 90, with third party systems 102, through Internet gateway 82 to the internet 84, and via Internet 84 to user's PC, PDA or cell phone 103 or to a customer service centre and database 104.

Examples of RF network 110 are shown in FIG. 8 as LIPD, Zigbee, Z-Wave, Insteon, Bluetooth and Wifi but are not intended to be limiting.

Figure 9:
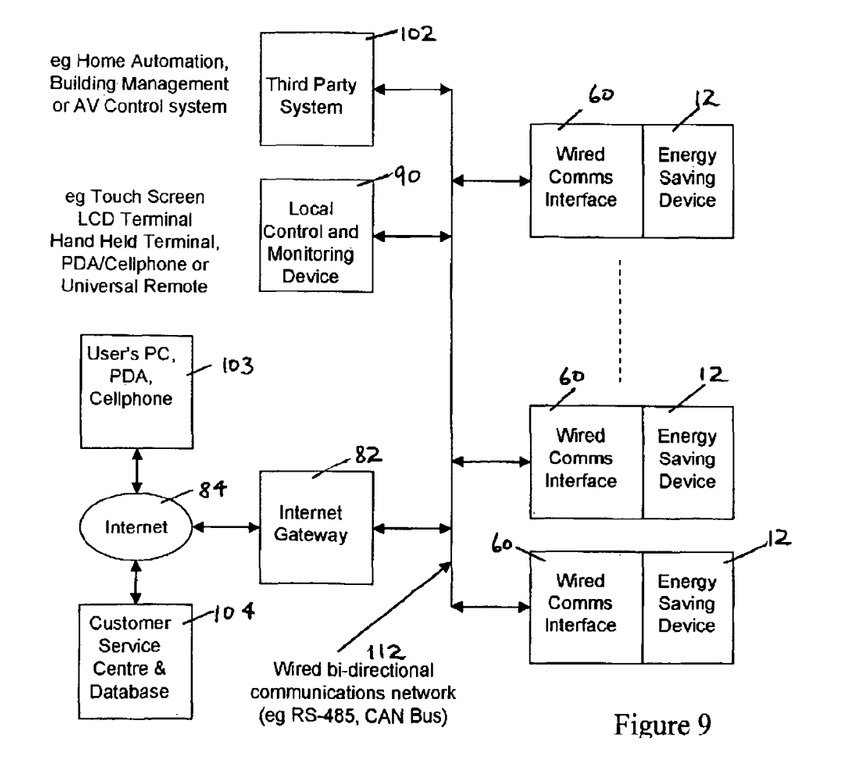
FIG. 9 is a block diagram showing an embodiment illustrating a wired network for an embodiment of the system of the invention.

FIG. 9 is a wired version of the networks in FIGS. 7 and 8. Each energy saving device 12 communicates with a wired communications interface 60.

In FIG. 9, local communications interconnectivity is provided by wire network 112. Wired networking communication is a standard technique applied to domestic, office, commercial, industrial and other environments. As indicated in FIG. 9, applicable wired networking technologies include RS-485 and CAN bus, but are not limited to those.

An embodiment of user interface of the invention will now be illustrated and described in connection with FIG. 10. In this embodiment, user interface 80a is in the form of a hand-held control and monitoring device.

In this embodiment, energy saving device 12 is linked to monitoring device 80a by communications interface 58 which in turn communicates with microcontroller 88.

It is to be understood that user interface 80a could instead be replaced by a local device 90a which would be hard wired.

User interface 80a provides facilities for a user to monitor and control energy saving devices 12. In this embodiment, user interface 80a also incorporates control features. Consequently, users can set operational parameters and settings to suit their particular electrical device configuration, usage habits and environment, in order to optimise energy saving capability and usability.

User interface 80a may take any suitable configuration. For example, it may be battery powered and in a hand-held form or it may be a wall mounted unit.

User interface 80a can include some or all of the following: LED indicators 64, an LCD hosting a graphical user interface 91, an LCD touch screen overlay 92, push buttons 68 for control and menu navigation, a keypad 94 for data entry and a beeper 66 for user alert functions, key click, etc.

In this embodiment, user interface 80a is supported by battery 96. Overall operation is controlled by microcontroller 88, which, as stated above, connects to communications interface 58 for communication with energy saving devices 12 via networked or point-to-point communications as indicated in FIG. 10.

Figure 10:
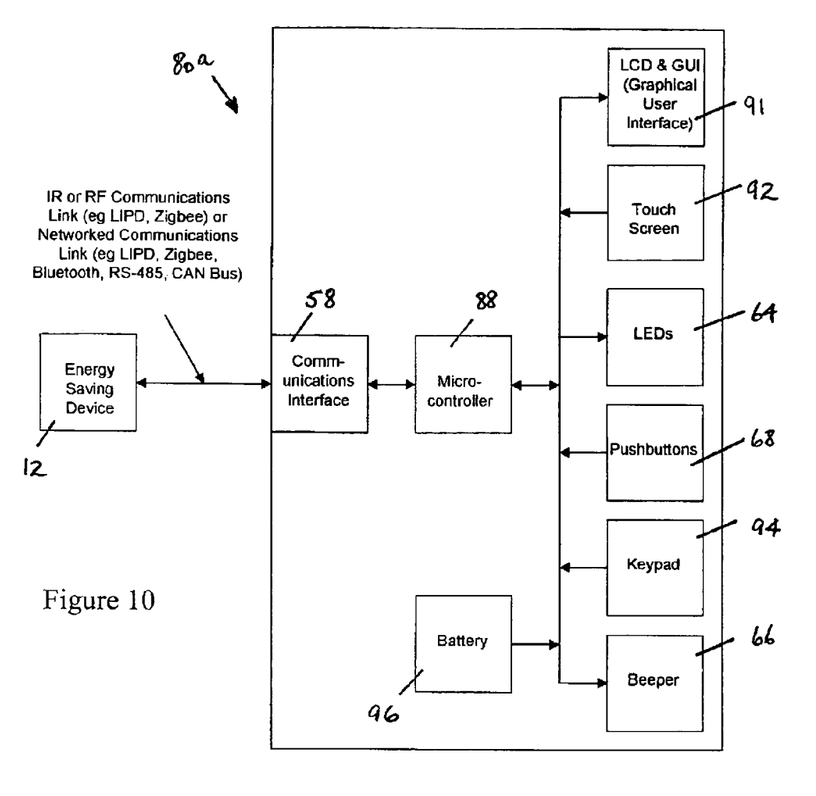
FIG. 10 is a block diagram showing an embodiment of a user interface of the invention including wireless local or handheld monitoring and control means.
Figure 11:
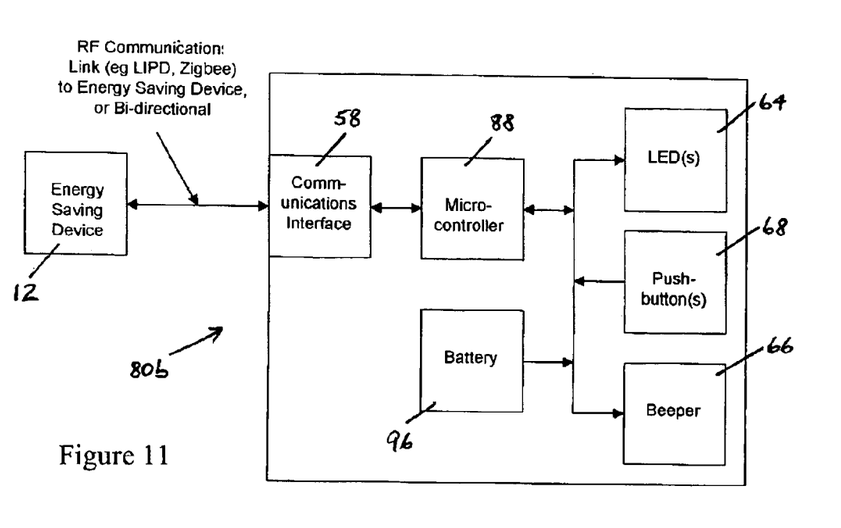
FIG. 11 is a block diagram showing an embodiment of user interface illustrating a wireless button or key fob monitoring and control means.

FIG. 11 shows a user interface 80b which is in some ways a simplified version of device 80a in FIG. 10. This is intended to be a low cost unit, to provide facilities for a user to monitor power consumption via beeper 66 and LEDs 64. In this embodiment, a user may also control energy saving devices 12 through push button 68. Push buttons 68 detect user key presses and, being powered by battery 96, relay these to energy saving device 12 via infra-red or wireless radio frequency communications.

Figure 12:
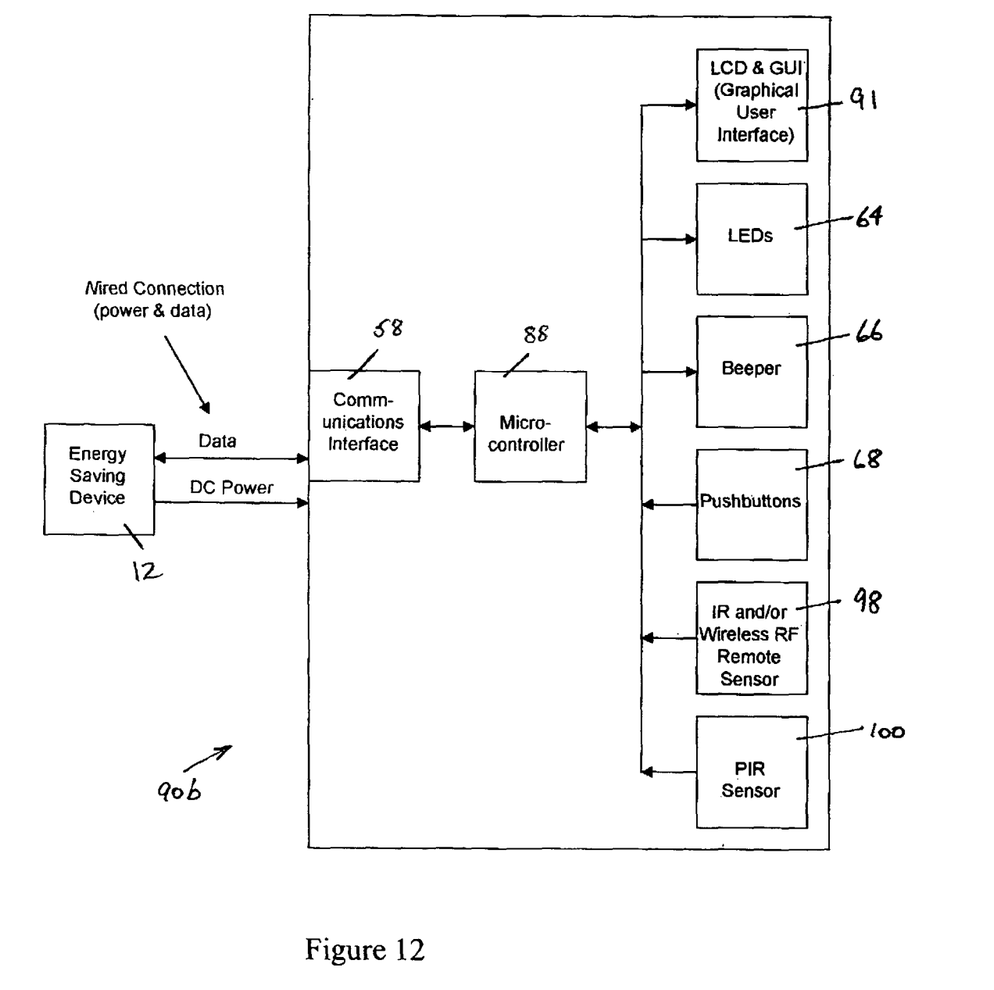
FIG. 12 is a block diagram showing a wired local monitoring and control means as user interface.

Referring now to FIG. 12, local control and sensing device 90b is similar to hand-held device 80a in FIG. 10, except that, being hard wired for both power and data, it omits battery 98, keypad 94 and touch screen 92. On the other hand, includes sensor 98 for infra-red and/or wireless radio frequency remote control sensing and user presence sensing.

Passive infra-red sensor (PIR) 100 is provided to sense the presence of users in the vicinity of device 90b.

It will be appreciated by one skilled in the art that the system of the invention in its various embodiments offers a range of advantages which improve energy saving capabilities when compared to those of stand-alone energy saving devices.

For example, local monitoring via a device front panel, hand-held device, etc, allows a user to monitor power and energy usage from individual outlets, for management of energy consumption within the home or office environment. For instance, abnormal energy consumption from a particular outlet in the home could be indicative of an energy savings device with incorrect parameter settings or configuration, or the presence of a faulty or misused appliance. Once detected, this can be controlled by a user in an appropriate way.

Local control via a device front panel, hand-held device, etc, can allow a user to control and optimize energy savings function for individual outlets, e.g. by setting idle power threshold levels, "active standby" timeout periods, etc. This can allow users to maximize energy saving, whilst preserving maximum user convenience for particular equipment configurations and usage scenarios.

Networked device monitoring can allow the user to conveniently monitor power and energy usage from individual outlets from a networked control panel or hand held device, for optimization of energy saving device performance and management of energy consumption within the home.

Networked device control can allow the user to conveniently control and optimize energy savings function for individual outlets from a networked control panel or hand-held device, e.g. by setting idle power threshold levels, "active standby" timeout periods, etc.

Networked device monitoring from a centralized facility, e.g. an electricity utility or an agency set up specifically for the purpose, can allow customer service personnel or automated systems to monitor power and energy usage from individual outlets, for management of energy consumption within the home.

Networked device control from a centralised facility, e.g. an electricity utility or an agency set up specifically for the purpose, can allow customer service personnel or automated systems to control and optimize energy savings function for individual outlets, e.g. by setting idle power threshold levels, "active standby" timeout periods, time-of-day usage based on tariffs, etc.

Networked device monitoring can allow abnormal usage such as excessive power consumption from particular GPOs in a home, office, or other environment, e.g. due to use of a portable heater. This can permit alerting of supervisory personnel regarding the abnormal energy usage.

Networked device monitoring can allow fault conditions, e.g. cessation of power consumption by a refrigerator or unexpected power usage by an unused appliance to be alerted to a user, e.g. via EMAIL, SMS etc.

Networked device monitoring can allow detection of unexpected unplugging of devices which may occur during theft, unauthorized access or usage, etc.

Networked device monitoring and control can allow the user to program energy saving devices with usage lockout functions, e.g. by time of day/day of week, usage duty cycle, usage allocation limit within time window, etc. This could be used to prevent excessive energy usage by devices such as televisions, PC's computer games, etc, as well as enhancing parental control of the use of these devices.

In summary, the system of the invention can allow a range of facilities to be implemented, from locally wire-connected, local wirelessly-connected, locally networked or remotely networked control facility:

a. User monitoring of power and energy usage from individual outlets, for management of energy consumption within the home or office environment. For example, abnormal energy consumption from a particular outlet in the home could be indicative of an energy savings device with incorrect parameter settings or configuration; or the presence of a faulty or misused appliance.

b. Optimization of energy savings for particular installations, mains powered equipment types and usage scenarios, by allowing the adjustment of a wide range of energy saving device operating parameters, including but not limited to power thresholds for mode discrimination, voltage and current sampling rates, power fluctuation filter time constants, data averaging periods, decision timeouts, over and under voltage trip thresholds, over-current trip threshold and any other parameter used by the energy saving device's energy saving algorithm.

c. User control to optimize energy savings function for individual outlets, e.g. by setting idle power threshold levels, "active standby" timeout periods, etc. This will allow users to maximize energy saving, whilst preserving maximum user convenience for particular equipment configurations and usage scenarios.

d. Customer service personnel or automated systems are able to monitor power and energy usage from individual outlets, for management of energy consumption within the home.

e. Customer service personnel or automated systems are able to control and optimize energy savings function for individual outlets, eg by setting idle power threshold levels, "active standby" timeout periods, time-of-day usage based on tariffs etc.

f. Detection and remediation of abnormal usage such as excessive power consumption from particular GPOs in a home, office, or other environment, eg due to use of a portable heater. Allows alerting of supervisory personnel regarding the abnormal energy usage.

g. Detection and reporting fault conditions, eg cessation of power consumption by a refrigerator or unexpected power usage by an unused appliance, and alert user, eg via EMAIL, SMS etc.

h. Detection of unexpected unplugging of devices which may occur during theft, unauthorized access or usage etc.

i. Programming of energy saving devices with usage lockout functions, eg by time of day/day of week, usage duty cycle, usage allocation limit within time window etc. This could be used to prevent excessive energy usage by devices such as televisions, PCs computer games etc, as well as enhancing parental control of the use of these devices.

j. Selective load shedding, eg in case of electricity supply restrictions arising from faults or extreme weather conditions.

Although the invention has been herein shown and described in what is conceived to be the most practical and preferred embodiments, it is recognised that departures can be made within the scope of the invention, which is not to be limited to the details described herein but is to be accorded the full scope of the disclosure so as to embrace any and all equivalent devices and apparatus.

The invention claimed is:

1. An energy saving device for reducing power consumption of an external electrical device, comprising:
   an input connectable to an external power supply;
   an output connectable to the external electrical device for selectively providing operating power thereto;
   a processor for controlling when power is supplied to the external electrical device via the output; and
   a sensor for monitoring wireless output signals of a remote control device that control functions of the external electrical device or another electrical device associated with the external electrical device, said sensor being coupled to the processor, and wherein the processor operates to terminate the power supplied to the external electrical device based upon the absence of the detection of the wireless output signals of the remote control device by the sensor.

2. The energy saving device of claim 1, wherein the wireless output signals of the remote control device comprise radio frequency (RF) control signals and wherein the sensor is configured for monitoring RF signals.

3. The energy saving device of claim 2, wherein wireless output signals of the remote control device comprise infrared (IR) control signals and wherein the sensor is configured for monitoring IR signals.

4. The energy saving device of claim 1, wherein the processor terminates the supply of power to the external electrical device when the absence of the detection of the wireless output signals of the remote control device by the sensor exceeds a predetermined time-out period.

5. The energy saving device of claim 1, further including an alert device, which provides an alert signal to a user prior to the termination of the power supply to the external electrical device.

6. The energy saving device of claim 5, wherein said alert device provides at least one of an audible signal or a visual signal.

7. The energy saving device of claim 1, further comprising a plurality of outputs, each of the plurality of outputs configured for selectively electrically connecting to the input for providing operating power to external electrical devices connected thereto.

8. The energy saving device of claim 1, further comprising a power sensor configured to sense power consumption of the external electrical device, the processor being further configured to determine an operational state of the external electrical device from the sensed power consumption and to terminate the power supplied to the external electrical device when the external electrical device is determined to be in a selected state.

9. An energy saving device including: an electrical input configured for connecting to a power supply; an electrical output configured for connecting to an electrical device of the type which, when connected to a power supply has an 'ON' state and a 'STANDBY' state; a switch configured to selectively connect said electrical output to said electrical input; and
   a sensor able to wirelessly sense activity of a user-operated remote control device for controlling the electrical device;
   wherein said switch is configured to disconnect said electrical output from said electrical input in response to at least one of:
   (i) said electrical device is in said 'ON' state and an absence of said activity is detected by said sensor for a predetermined timeout period, or,
   (ii) said electrical device entering said 'STANDBY' state.

10. An energy saving device including an electrical plug configured for connecting to a mains power supply; an electrical socket configured for connecting to an electrical device;
    a switch configured to control electrical connection between said electrical plug and said electrical socket;
    a sensor configured to wirelessly sense activity of a user-operated remote control device,
    the activity configured to control said electrical device; a control module configured to monitor the sensor to determine a first length of time during which said activity has not been detected and to operate said switch to disconnect electrical connection between the electrical plug and the electrical socket when said first length of time exceeds a threshold value to prevent the electrical device from drawing power during at least some times when no user is present and using the electrical device.

11. The energy saving device of claim 10 further comprising a warning device operated by the control module, the warning device configured to warn that the threshold value is shortly to be reached, and wherein the sensor is further configured to detect a signal from the remote control device and said signal to be monitored by the control module, wherein responsive to said signal, the switch is not operated to disconnect the electrical connection between the electrical plug and the electrical socket.

12. A system for monitoring power consumption of and controlling power supply to a plurality of electrical devices, the system including:
    communication apparatus for communicating with an energy saving device, the energy saving device having:
    a single electrical inlet configured to connect to a mains supply electrical outlet; and
    a plurality of controlled electrical outlets for selectively supplying electrical power to the electrical devices; and
    a power sensor for monitoring power consumption of at least one of the electrical devices connected to the controlled electrical outlets;
    a processor configured to control the connection of electrical supply from the mains supply electrical outlet to each of the controlled electrical outlets in response to a sensed power consumption state of at least one of the electrical devices
    a device sensor for monitoring output of a remote control device, said device sensor being coupled to the device processor, and wherein the device processor operates to terminate the power supplied to the external electrical device based upon the absence of the detection of output of the remote control device by the sensor.

13. The system of claim 12 wherein each of the energy saving devices comprises:
    an input connectable to an external power supply;
    an output connectable to the external electrical device for selectively providing operating power thereto;
    a device processor for controlling when power is supplied to the external electrical device via the output; and
    a device sensor for monitoring output of a remote control device, said device sensor being coupled to the device processor, and wherein the device processor operates to terminate the power supplied to the external electrical device based upon the absence of the detection of output of the remote control device by the sensor.

14. The system of claim 12 further comprising an output for outputting data relating to the monitored power consumption.

15. The system of claim 14, wherein the processor is configured to control power supply to the electrical devices in response to the data output relating to monitored power consumption.

16. The system of claim 14 wherein the processor is configured to provide adjustment settings of the energy saving device in response to the data output relating to monitored power consumption.

* * * * *